(12) United States Patent
Roppelt et al.

(10) Patent No.: US 11,486,023 B2
(45) Date of Patent: Nov. 1, 2022

(54) METHOD FOR RECOVERING URANIUM FROM COMPONENTS CONTAMINATED WITH URANIUM OXIDE

(71) Applicant: FRAMATOME GMBH, Erlangen (DE)

(72) Inventors: Alfons Roppelt, Forchheim (DE); Sebastian Hoppe, Hausen (DE); Wolfgang Schmid, Schwaig (DE); Rainer Bezold, Dormitz (DE); Juergen Eissner, Dinkelsbuehl (DE); Norbert Bergmann, Erlangen (DE)

(73) Assignee: Framatome GmbH, Erlangen (DE)

( * ) Notice: Subject to any disclaimer, the term of this patent is extended or adjusted under 35 U.S.C. 154(b) by 552 days.

(21) Appl. No.: 16/584,995

(22) Filed: Sep. 27, 2019

(65) Prior Publication Data

US 2020/0024688 A1 Jan. 23, 2020

Related U.S. Application Data

(63) Continuation of application No. PCT/EP2018/057999, filed on Mar. 28, 2018.

(30) Foreign Application Priority Data

Mar. 31, 2017 (DE) ...................... 10 2017 107 037.0

(51) Int. Cl.
*C22B 60/02* (2006.01)
(52) U.S. Cl.
CPC ........ *C22B 60/026* (2013.01); *C22B 60/0278* (2013.01)
(58) Field of Classification Search
CPC ................................................ C22B 60/0278
(Continued)

(56) References Cited

U.S. PATENT DOCUMENTS

| 4,657,596 A | 4/1987 | Murrey et al. |
| 5,745,835 A | 4/1998 | Mouliney et al. |

FOREIGN PATENT DOCUMENTS

| CN | 204211492 U | 3/2015 |
| JP | H09315820 A | 12/1997 |

(Continued)

OTHER PUBLICATIONS

Rudisill et al: "Decontamination of Zircaloy cladding hulls from spent nuclear fuel", Journal of Nuclear Materials, Elsevier B.V, Netherlands, vol. 385, No. 1, Mar. 15, 2009 (Mar. 15, 2009), pp. 193-195, XP025996484, ISSN: 0022-3115, DOI: 10.1016/J.JNUCMAT. 2008.10.016 [retrieved on Nov. 7, 2008].

*Primary Examiner* — Melissa S Swain
(74) *Attorney, Agent, or Firm* — Laurence A. Greenberg; Werner H. Stemer; Ralph E. Locher

(57) ABSTRACT

A process for recovering uranium from components contaminated with uranium oxide includes providing a cleaning apparatus with a cleaning solution for dissolving the uranium oxide of the components, carrying out a cleaning process by introducing a batch of components into the cleaning apparatus, and carrying out a measurement for determining the uranium content of the components. The cleaning and the measuring are repeated if a limit value for the uranium content is exceeded. The components are discharged from the process if the uranium content falls below a limit value. The cleaning is carried out on a plurality of successive batches of components until a control measurement indicates an unsatisfactory cleaning action of the cleaning solution. The uranium oxide dissolved in the cleaning solution is recovered after indication of the unsatisfactory cleaning action.

17 Claims, 3 Drawing Sheets

(58) Field of Classification Search
USPC .............................................................. 423/8
See application file for complete search history.

(56) References Cited

FOREIGN PATENT DOCUMENTS

| | | |
|---|---|---|
| JP | H10132999 A | 5/1998 |
| JP | 2002055196 A | 2/2002 |

METHOD FOR RECOVERING URANIUM FROM COMPONENTS CONTAMINATED WITH URANIUM OXIDE

CROSS-REFERENCE TO RELATED APPLICATION

This is a continuation application, under 35 U.S.C. § 120, of copending International Application PCT/EP2018/057999, filed Mar. 28, 2018, which designated the United States; this application also claims the priority, under 35 U.S.C. § 119, of German Patent Application DE 10 2017 107 037.0, filed Mar. 31, 2017; the prior applications are herewith incorporated by reference in their entirety.

BACKGROUND OF THE INVENTION

Field of the Invention

The invention relates to a process for recovering uranium, in particular uranium in the form of uranium salts or uranium oxide, from components contaminated with uranium oxide, for example emptied sheathing tubes or fuel rod sheathing tubes.

In order for uranium-contaminated components, for example emptied sheathing tubes or fuel rod sheathing tubes, to be radiologically approved for release without restriction for nuclear dismantling or in waste conditioning, those components have to go through a cleaning operation.

SUMMARY OF THE INVENTION

It is accordingly an object of the invention to provide a method for recovering uranium from components contaminated with uranium oxide, which overcomes the hereinafore-mentioned disadvantages of the heretofore-known methods of this general type and, in particular, in which uranium oxide can be dissolved away from components contaminated with uranium oxide and can subsequently be recovered.

With the foregoing and other objects in view there is provided, in accordance with the invention, a process for recovering uranium from components contaminated with uranium oxide, the method comprising the following steps:
 a) providing a cleaning apparatus with a cleaning solution for dissolving the uranium oxide of the components, preferably for dissolving uranium oxide from the surface of the components,
 b1) carrying out a cleaning process by introducing a batch of components into the cleaning apparatus,
 b2) carrying out a measurement for determining the uranium content of the components,
 b2.1) in the case of a limit value for the uranium content being exceeded: repeating steps b1) and b2),
 b2.2) in the case of the uranium content falling below a limit value: discharging the components from the process,
 c) carrying out the cleaning step b) on a plurality of successive batches of components until a control measurement indicates an unsatisfactory cleaning action of the cleaning solution, and
 d) after indication of the unsatisfactory cleaning action: recovering the uranium oxide dissolved in the cleaning solution.

The advantages of the invention are, in particular, that further use of the components is possible and costly disposal is dispensed with.

In a particularly preferred further development of the invention, the cleaning apparatus is or includes an acid bath and the cleaning solution includes an acid, with the acid preferably being nitric acid and the nitric acid having, for example, a concentration of from 1% to 70%, preferably from 2% to 60%.

In order to carry out measurements of the uranium content, a measurement apparatus is preferably provided, where the measurement apparatus includes a measurement booth and the measurement booth has one or more gamma detectors and/or a central measuring probe for measuring the uranium content, where the gamma detectors are preferably disposed in the side regions and/or on the side walls of the measurement booth. The expression side walls also encompasses the floor and the ceiling of the measurement booth.

Before a batch of components is introduced into the cleaning apparatus, the batch of components can be introduced into the measurement apparatus for carrying out a first measurement of the uranium content, where the first measurement is preferably carried out over a prescribed period of time, for example from 1 minute to 48 hours, preferably from 5 minutes to 24 hours.

Furthermore, the components of a batch of components can be stored in a transport and/or storage vessel, for example a drum, during the first measurement, with the transport and/or storage vessel preferably being introduced completely into the measurement booth for carrying out the first measurement.

In one variant of the invention, the central probe for carrying out the first measurement is inserted centrally into the transport and/or storage vessel, preferably before the transport and/or storage vessel is introduced into the measurement booth.

The cleaning solution is preferably heated, preferably electrically, during the cleaning process, for example to temperatures in the range from 20° C. to 110° C., preferably to temperatures in the range from 30° C. to 100° C. A heating device which is, for example, provided on or in the side walls of the cleaning apparatus preferably serves for heating.

Furthermore, the cleaning solution can be excited by ultrasound during the cleaning process. The ultrasound is preferably produced by an ultrasound generator which is, for example, provided at or under the bottom of the cleaning apparatus.

In a further development of the invention, the cleaning solution is subjected to convective flow during the cleaning process according to step b1), so that the cleaning solution flows around and/or through the components of a batch of components.

In one variant of the invention, the components of a batch of components, after the cleaning process according to step b1), are discharged from the cleaning apparatus, for example by using a crane, and introduced into a deionate bath, with the components of a batch of components residing in the deionate bath for a prescribed period of time, for example from 1 minute to 48 hours, preferably from 5 minutes to 24 hours.

It is also possible for the components of a batch of components to be discharged from the deionate bath after the deionate bath, for example by using a crane, and introduced into a dripping-off tank, with the components of a batch of components residing in the dripping-off tank for a prescribed period of time, for example from 1 minute to 48 hours, preferably from 5 minutes to 24 hours, to effect drying.

In a further development of the invention, the components of a batch of components are stored in a transport basket, for example a transport basket made of stainless steel, during the cleaning process according to step b1).

The components of a batch of components are preferably relocated from the transport and/or storage vessel into the transport basket, for example manually by an operator, before introduction into the cleaning apparatus.

In order to allow convective flow, a spacer can be provided between a bottom of the cleaning apparatus and the transport basket.

In a preferred variant of the invention, the components of a batch of components are relocated into a preferably nonmetallic measurement vessel before the measurement according to step b2).

It is possible for the components of a batch of components to be introduced in the measurement vessel into the measurement apparatus for carrying out the measurement according to step b2), with the measurement vessel preferably being introduced completely into the measurement booth.

The components discharged from the cleaning process can be stored in the measurement vessel in which they have been subjected to the measurement according to step b2), with the measurement vessel being closed and the closed measurement vessel being passed to further process steps or storage.

The control measurement for determining an unsatisfactory cleaning action of the cleaning solution preferably includes a pH test.

In a further development of the invention, the cleaning solution is neutralized after the unsatisfactory cleaning action of the cleaning solution has been indicated, with uranium being present in the neutralized cleaning solution after neutralization of the cleaning solution as salt, either in dissolved form, in particular as unsaturated salt solution, or in undissolved form, in particular as saturated salt solution.

It is possible for undissolved uranium salts to be filtered off. As an alternative or in addition, the dissolved uranium salts can be isolated by distillation.

In a particularly preferred variant of the invention, the uranium salts which have been filtered off and/or the uranium salts isolated by distillation are converted thermally, for example in the range from 50° C. to 650° C., preferably from 100° C. to 600° C., in air into uranium oxide.

It is possible, for example, for the following process to be carried out by using the measurement apparatus and/or for carrying out the measurement according to step b2) and/or for carrying out the first measurement: The measurement is carried out, depending on the background radiation and on the degree of contamination of the components, for a period of, for example, from 5 minutes to 24 hours.

The total measurement signal is made up of the cumulated measurement signals of the gamma detectors and the central measuring probe. The integrated count rate of the total gamma-ray energy spectrum of all gamma detectors and the central measuring probe (this is referred to as gross count rate) is measured. A previously determined, average background is subtracted from this gross count rate in order to obtain the net count rate. This is weighted by using a calibration factor which is given by the ratio of Becquerel/count impulse in the detector geometry present and has likewise been determined beforehand.

The weighted net signal then corresponds to the activity of the uranium isotopes $^{235}U$ and $^{238}U$ in the batch of components. The isotope $^{234}U$ which is always also present can be determined purely arithmetically from the ratio of $^{235}U$ and $^{238}U$.

The total uranium content on the components is, finally, given by the sum of the three uranium isotope masses.

Other features which are considered as characteristic for the invention are set forth in the appended claims.

Although the invention is illustrated and described herein as embodied in a method for recovering uranium from components contaminated with uranium oxide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
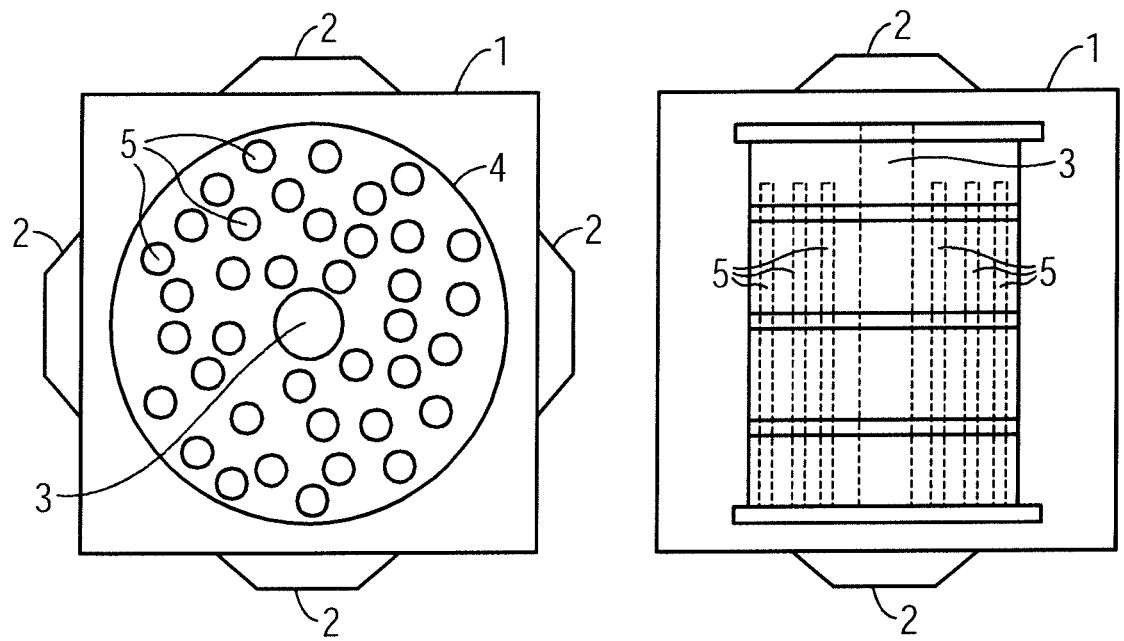
FIG. 1 includes a diagrammatic, cross-sectional view from above and a vertical-sectional view from the side of a measurement apparatus.

Referring now in detail to the figures of the drawings. in which corresponding parts and components are denoted by the same reference numerals, and first, particularly, to FIG. 1 thereof, there is seen a starting situation in which components 5 contaminated with uranium oxide are present in transport and/or storage vessels 4, for example drums for radioactive waste, with each transport and/or storage vessel 4 containing a batch of components 5.

In a first step, a transport and/or storage vessel 4 with a batch of the components 5 contaminated with uranium oxide is introduced completely into a measurement apparatus 1 provided, as is depicted in FIG. 1, for carrying out a first measurement.

The measurement apparatus 1 includes a measurement booth, with the measurement booth having a plurality of gamma detectors 2, in the present case six gamma detectors 2, and a central measuring probe 3 for measuring the uranium content. As is shown in FIG. 1, the gamma detectors 2 are provided on the six side walls of the measurement booth.

The central probe 3 for carrying out the first measurement is inserted centrally into the transport and/or storage vessel 4 before the transport and/or storage vessel 4 is introduced into the measurement apparatus.

The measurement is carried out, depending on the background radiation and on the degree of contamination of the components, for a period of from 5 minutes to 24 hours.

A total measurement signal is made up of cumulated measurement signals of the gamma detectors 2 and the central measuring probe 3. An integrated count rate of the total gamma-ray energy spectrum of all of the gamma detectors 2 and the central measuring probe 3 (this is taken as gross count rate) is measured. A previously determined average background is subtracted from this gross count rate in order to obtain a net count rate. This is weighted by a calibration factor which is the ratio of Becquerel/count impulse in the detector geometry which is present and has likewise been determined beforehand.

The weighted net signal then corresponds to the activity of the uranium isotopes $^{235}U$ and $^{238}U$ in the batch of components 5. The isotope $^{234}U$ which is always also present can be determined purely arithmetically from the ratio of $^{235}U$ and $^{238}U$. The total uranium content on the components 5 is, finally, given by the sum of the three uranium isotope masses.

Figure 3:
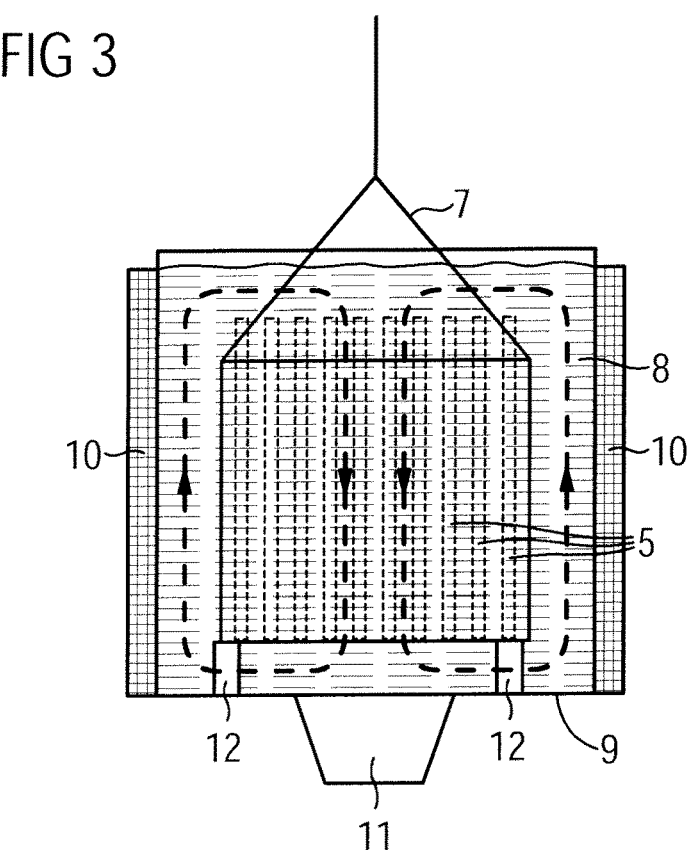
FIG. 3 is a side-elevational view of a cleaning apparatus with a cleaning solution and the transport basket according to FIG. 2 disposed therein.

In order to carry out the cleaning process of step b1), a cleaning apparatus 9, as is shown in FIG. 3, with a cleaning solution 8 for dissolving the uranium oxide of the components 5 is provided in a step a). The uranium oxide is present on the surfaces of the components 5. The cleaning apparatus 9 is an acid bath and the cleaning solution 8 includes an acid. The acid is nitric acid having a concentration in the range from 2% to 60%.

Figure 2:
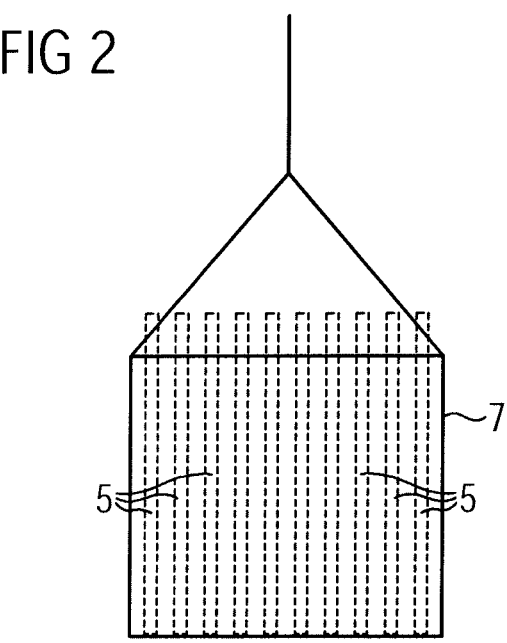
FIG. 2 is a side-elevational view of a transport basket loaded with a batch of components.

The batch of components 5 contaminated with uranium oxide is then manually relocated by an operator from the transport and/or storage vessel 4 into a transport basket 7 made of stainless steel, as is shown in FIG. 2.

In order to carry out the cleaning process according to step b1), the batch of components 5 in the transport basket 7 is subsequently introduced by using a crane into the acid bath.

The cleaning solution 8 is heated to temperatures in the range from 30° C. to 100° C. by using a heating device 10 during the cleaning process and is excited by ultrasound produced by an ultrasound generator 11.

During the cleaning process of step b1), the cleaning solution 8 is subjected to convective flow, so that the cleaning solution 8 flows around and/or through the components 5 of the batch of components 5. In order to make the convective flow and flow around and through the components 5 possible, a spacer 12 is provided between a bottom of the cleaning apparatus 9 and the transport basket 7.

Figure 4:
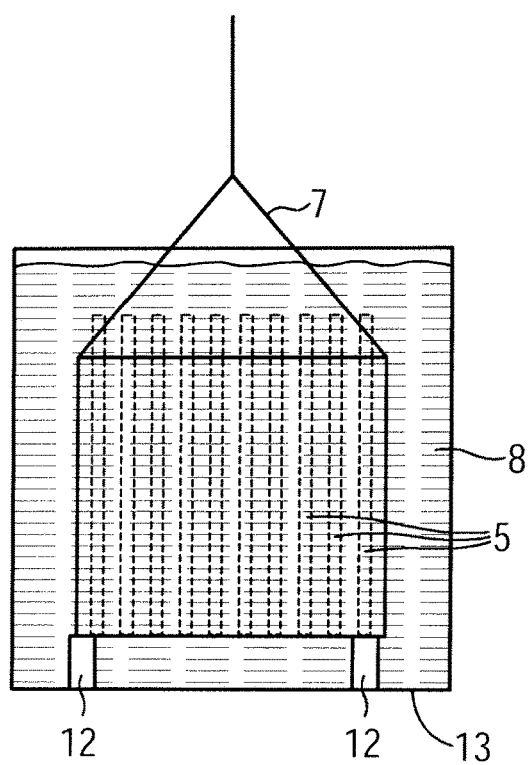
FIG. 4 is a side-elevational view of a deionate bath and the transport basket according to FIG. 2 disposed therein.
Figure 5:
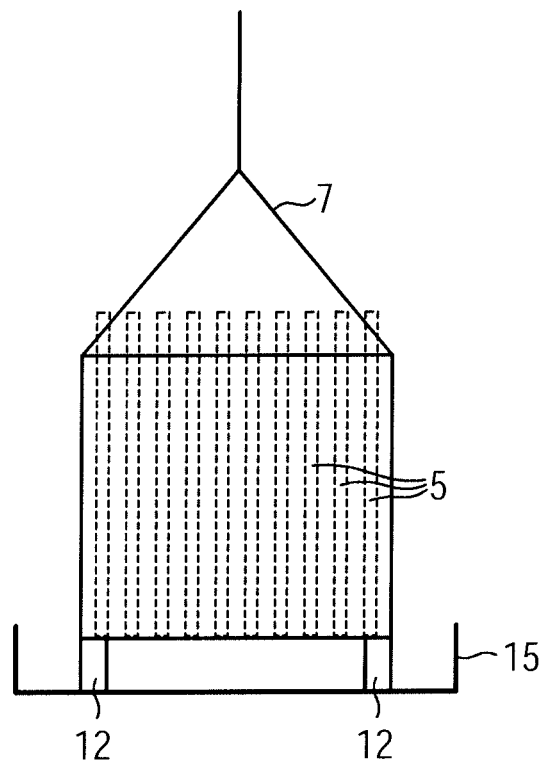
FIG. 5 is a side-elevational view of a dripping-off tank and the transport basket according to FIG. 2 disposed therein.

The transport basket 7 with the batch of components 5 is discharged from the cleaning apparatus 9 after the cleaning process of step b1) by using a crane and is introduced into a deionate bath 13, as is depicted in FIG. 4, in order to wash off remaining acid. The components 5 of the batch of components 5 then reside in the deionate bath 13 for a prescribed period of from 5 minutes to 24 hours. Once again, spacers 12 between the transport basket 7 and the bottom of the deionate bath 13 allow convection of the liquid.

After the deionate bath 13, the components 5 of the batch of components 5 are discharged from the deionate bath 13 and are carried in the transport basket 7 to a dripping-off tank 15 by using a crane. The components 5 of the batch of components 5 then reside in the dripping-off tank 15 for a prescribed period of from 5 minutes to 24 hours in order to effect drying.

Figure 6:
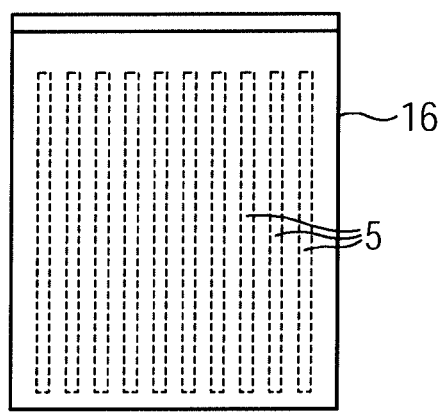
FIG. 6 is a side-elevational view of a closed measurement vessel with components disposed therein.

After drying and before the measurement according to step b2), the components 5 of the batch of components 5 are manually relocated from the transport basket 7 into a nonmetallic measurement vessel 16 as shown in FIG. 6.

A measurement for determining the uranium content of the components 5 is subsequently carried out according to step b2).

The components 5 of the batch of components 5 are introduced into the measurement apparatus 1 in order to carry out the measurement according to step b2) in the measurement vessel 16.

If the measurement indicates that a limit value for the uranium content is exceeded, the steps b1) and b2) are repeated in accordance with the provisions of step b2.1). This means that the steps b1) and b2) are repeated iteratively until a necessary cleaning effect has been achieved.

If the measurement indicates that the uranium content has gone below a limit value, the components 5 are discharged from the process in accordance with the provisions of step b2.2).

The components 5 discharged from the cleaning process are stored in the measurement vessel 16 in which they have been subjected to the measurement according to step b2), with the measurement vessel 16 being closed and the closed measurement vessel 16 being passed to further process steps or storage.

The cleaning step b) is carried out in accordance with the provisions of step c) on a plurality of successive batches of components 5 until a control measurement indicates an unsatisfactory cleaning action of the cleaning solution 8. The control measurement for determining the unsatisfactory cleaning action of the cleaning solution 8 includes a pH test.

According to step d), the uranium oxide dissolved in the cleaning solution 8 is recovered after the unsatisfactory cleaning action has been indicated.

For this purpose, the cleaning solution including nitric acid is neutralized, with uranium being present in the neutralized cleaning solution 8 after the neutralization as salt, either in dissolved form as unsaturated salt solution or in undissolved form as saturated salt solution.

The undissolved uranium salts are subsequently filtered off and the dissolved uranium salts are isolated by distillation of the starting salt solution.

The uranium salts which have been filtered off and the uranium salts isolated by distillation are finally converted thermally in the range from 100° C. to 600° C. in air into uranium oxide and recovered in this way.

The following is a summary list of reference numerals and the corresponding structure used in the above description of the invention:

1 Measurement apparatus
2 Gamma detector
3 Central measuring probe
4 Transport and/or storage vessel
5 Component
7 Transport basket
8 Cleaning solution
9 Cleaning apparatus
10 Heating device
11 Ultrasound generator
12 Spacer
13 Deionate bath
15 Dripping-off tank
16 Measurement vessel

The invention claimed is:

1. A process for recovering uranium from components contaminated with uranium oxide, the process comprising the following steps:
   a) providing a cleaning apparatus with a cleaning solution for dissolving the uranium oxide of the components;
   b1) carrying out a cleaning process by introducing a batch of components into the cleaning apparatus;
   b2) carrying out a measurement for determining a uranium content of the components;

b2.1) repeating steps b1) and b2) if a limit value for the uranium content is exceeded;
b2.2) discharging the components from the process if the uranium content falls below a limit value;
c) carrying out the cleaning step b) on a plurality of successive batches of components until a control measurement indicates an unsatisfactory cleaning action of the cleaning solution;
d) recovering the uranium oxide dissolved in the cleaning solution after an indication of the unsatisfactory cleaning action;
subjecting the cleaning solution to convective flow during the cleaning process according to step b1), causing the cleaning solution to flow at least one of around or through the components of a batch of components;
storing the components in a transport basket during the cleaning process; and
providing a spacer between a bottom of the cleaning apparatus and the transport basket to allow the convective flow.

2. The process according to claim 1, wherein the cleaning apparatus is or includes an acid bath, and the cleaning solution includes an acid.

3. The process according to claim 1, which further comprises providing a measurement apparatus for carrying out measurements of the uranium content, the measurement apparatus including a measurement booth and the measurement booth having at least one of one or more gamma detectors or a central measuring probe for measuring the uranium content.

4. The process according to claim 3, which further comprises introducing a batch of components into the measurement apparatus for carrying out a first measurement of the uranium content, before introducing the batch of components into the cleaning apparatus.

5. The process according to claim 4, which further comprises storing the components of a batch of components in a vessel for at least one of transport or storage during the first measurement.

6. The process according to claim 5, which further comprises inserting the central probe centrally into the vessel for carrying out the first measurement.

7. The process according to claim 1, which further comprises at least one of:
heating the cleaning solution during the cleaning process, or
exciting the cleaning solution by ultrasound during the cleaning process.

8. The process according to claim 1, which further comprises:
discharging the components of a batch of components from the cleaning apparatus after the cleaning process according to step b1);
then introducing the components of the batch of components into a deionate bath; and
keeping the components of the batch of components in the deionate bath for a prescribed period of time.

9. The process according to claim 8, which further comprises:
discharging the components of a batch of components from the deionate bath after the deionate bath;
then introducing the components of the batch of components into a dripping-off tank; and
keeping the components of the batch of components in the dripping-off tank for a prescribed period of time to effect drying.

10. The process according to claim 5, which further comprises relocating the components of a batch of components from the vessel into the transport basket before introduction into the cleaning apparatus.

11. The process according to claim 1, which further comprises relocating the components of a batch of components into a measurement vessel before the measurement according to step b2).

12. The process according to claim 11, which further comprises:
providing a measurement apparatus for carrying out measurements of the uranium content, the measurement apparatus including a measurement booth and the measurement booth having at least one of one or more gamma detectors or a central measuring probe for measuring the uranium content; and
introducing the components of the batch of components into the measurement apparatus for carrying out the measurement according to step b2) in the measurement vessel.

13. The process according to claim 11, which further comprises storing the components discharged from the cleaning process in the measurement vessel in which they have been subjected to the measurement according to step b2), with the measurement vessel being closed and the closed measurement vessel being passed to further process steps or storage.

14. The process according to claim 1, which further comprises including a pH test in the control measurement for determining an unsatisfactory cleaning action of the cleaning solution.

15. The process according to claim 1, which further comprises neutralizing the cleaning solution after the unsatisfactory cleaning action of the cleaning solution has been indicated, with uranium being present in the neutralized cleaning solution after neutralization of the cleaning solution as salt, either in dissolved or undissolved form.

16. The process according to claim 15, which further comprises at least one of:
filtering-off undissolved uranium salts, or
isolating dissolved uranium salts by distillation.

17. The process according to claim 16, which further comprises thermally converting at least one of the uranium salts having been filtered off or the uranium salts isolated by distillation, in air into uranium oxide.

* * * * *